(12) United States Patent
Beck

(10) Patent No.: US 7,344,127 B2
(45) Date of Patent: Mar. 18, 2008

(54) SELF-PUMPING HYDROPNEUMATIC SPRING STRUT WITH INTERNAL LEVEL CONTROL

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/543,697

(22) Filed: Oct. 5, 2006

(65) Prior Publication Data

US 2007/0085247 A1  Apr. 19, 2007

(30) Foreign Application Priority Data

Oct. 10, 2005  (DE) .................... 10 2005 048 742

(51) Int. Cl.
*F16F 5/00* (2006.01)
(52) U.S. Cl. .................................. 267/64.17; 267/64.16
(58) Field of Classification Search ................ 188/276, 188/322.13, 315; 267/64.17, 64.16
See application file for complete search history.

(56) References Cited

U.S. PATENT DOCUMENTS

| 3,033,556 | A | * | 5/1962 | Wossner | .................. | 267/64.19 |
| 4,624,346 | A | * | 11/1986 | Katz | ....................... | 188/282.9 |
| 4,802,561 | A | * | 2/1989 | Knecht et al. | .............. | 188/318 |
| 4,850,460 | A | * | 7/1989 | Knecht et al. | ........... | 188/266.6 |
| 4,880,086 | A | * | 11/1989 | Knecht et al. | ........... | 188/266.6 |
| 4,993,693 | A | * | 2/1991 | Lohr et al. | ................ | 267/64.17 |
| 5,392,885 | A | * | 2/1995 | Patzenhauer et al. | .... | 188/282.1 |
| 5,533,596 | A | * | 7/1996 | Patzenhauer et al. | .... | 188/266.6 |
| 6,494,441 | B2 | * | 12/2002 | Beck et al. | .............. | 267/64.16 |
| 6,494,442 | B2 | | 12/2002 | Beck et al. | | |
| 6,553,761 | B2 | | 4/2003 | Beck | | |
| 6,648,309 | B2 | * | 11/2003 | Beck | ........................ | 267/64.17 |
| 6,871,845 | B2 | * | 3/2005 | Beck | ........................ | 267/64.17 |
| 2002/0105118 | A1 | * | 8/2002 | Beck | ........................ | 267/64.27 |
| 2005/0173214 | A1 | * | 8/2005 | Lemmens et al. | ..... | 188/322.13 |

FOREIGN PATENT DOCUMENTS

DE        100 19 531        10/2001

* cited by examiner

*Primary Examiner*—Christopher P. Schwartz
(74) *Attorney, Agent, or Firm*—Cohen Pontani Lieberman & Pavane LLP

(57) ABSTRACT

The self-pumping hydropneumatic spring strut with an internal level control includes a cylinder having a high-pressure chamber and a low-pressure chamber, both chambers being at least partially filled with oil, the high-pressure chamber further comprising a gas cushion acting as a spring element. The spring strut also has an axially movable hollow piston rod arranged within the cylinder and carrying a working piston separating two working spaces arranged in the cylinder, one of the working spaces being connected to the high-pressure chamber, and a piston pump, which is driven by movements of the spring element, thus conveying oil from the low-pressure chamber to the working space connected to the high-pressure chamber. The piston pump includes a flow connection, which connects the high-pressure chamber to the low-pressure chamber. An adjustable valve is arranged in the flow connection, the valve opening as a function of pressure and thus allowing the oil to pass from the high-pressure chamber to the low-pressure chamber.

10 Claims, 5 Drawing Sheets

SELF-PUMPING HYDROPNEUMATIC SPRING STRUT WITH INTERNAL LEVEL CONTROL

BACKGROUND OF THE INVENTION

1. Field of the Invention

The invention pertains to a self-pumping hydropneumatic spring strut with internal level control, especially for motor vehicles.

2. Description of the Related Art

Self-pumping hydropneumatic spring struts usually comprise an oil-filled working cylinder, subject to the pressure of at least one gas cushion, which is located in a high-pressure chamber and acts as a spring, the working cylinder being divided into two working spaces by a working piston carried by a hollow piston rod, and a piston pump, which is driven by the movements of the spring, thus conveying oil from a low-pressure chamber to the working space connected to the high-pressure chamber, the piston pump being provided with a flow connection, which connects the high-pressure chamber to the low-pressure chamber.

Motor vehicle spring systems which are equipped with level control for adjusting the vehicle body to a predetermined height are already known (see, for example, DE 100 19 531 A1). A spring system of this type consists of at least one piston-cylinder assembly comprising a damping piston provided with a working cylinder, a piston rod, and a damping valve; a pump of an oil reservoir; and corresponding feed and return lines leading from the oil reservoir to the piston-cylinder assembly and vice versa, wherein the pump, consisting of a pump piston and a drive, is installed in such a way that the pressure of the piston-cylinder assembly acts on the pressure and drive side of the pump piston. In the presence of a fully automatic level control system of this type, the vehicle body can be raised by the action of this electric pump and lowered again correspondingly by the use of a discharge valve. A system of this type is able to meet the demand for maintaining the vehicle body at any one of several different levels, but it suffers from the disadvantage that the system is expensive to manufacture.

Self-pumping hydropneumatic spring struts are also known (see, for example, U.S. Pat. No. 6,494,442) in which the level control of the spring strut is brought about by a piston pump, which is driven by the movements of the spring and thus conveys oil from a low-pressure chamber to the working space connected to the high-pressure chamber. This type of spring strut also has an actuating drive, which shifts the spring strut as a whole in the vertical direction. With the help of the hydropneumatic spring strut in conjunction with a separate actuating drive, this system makes it possible to maintain the vehicle body at various levels, but, because of the nature of the system, sufficient installation space must be available in the vehicle. An appropriate amount of outside energy must also be supplied.

SUMMARY OF THE INVENTION

It is an object of the invention to create a self-pumping hydropneumatic spring strut with internal level control which is compact, which can be manufactured at low cost, and which requires only a minimum of outside energy to adjust the vehicle body to various levels.

According to a preferred embodiment of the invention an adjustable valve is arranged in the flow connection, the valve opening as a function of pressure and allowing the oil to pass from the low-pressure chamber toward the high-pressure chamber.

It is an advantage of this embodiment that the hydropneumatic spring strut is controlled not as a function of distance according to the state of the art, but rather as a function of pressure. The desired pressure can be built up in the high-pressure chamber by the use of the valve which is installed between the high-pressure chamber and the low-pressure chamber and which opens as a function of pressure. In principle, therefore, it is possible to create a continuously variable level control system.

According to another preferred embodiment the level of a motor vehicle can be adjusted by the valve as a function of pressure.

Further, the valve can be controlled manually and externally. Advantageously, an electromagnet is provided as the external control element.

According to a favorable embodiment, the flow connection is opened and closed by a valve body. It is advantageous for the valve body to be spring-loaded.

According to another embodiment, the flow connection has a shut-off element acting as a function of pressure. It is advantageous for the shut-off element to be spring-loaded.

In a favorable embodiment, the valve body is subject to pilot control by the internal pressure of the spring strut.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred exemplary embodiments of the invention are illustrated schematically in the drawings.

DETAILED DESCRIPTION OF THE PRESENTLY PREFERRED EMBODIMENTS

Figure 1:
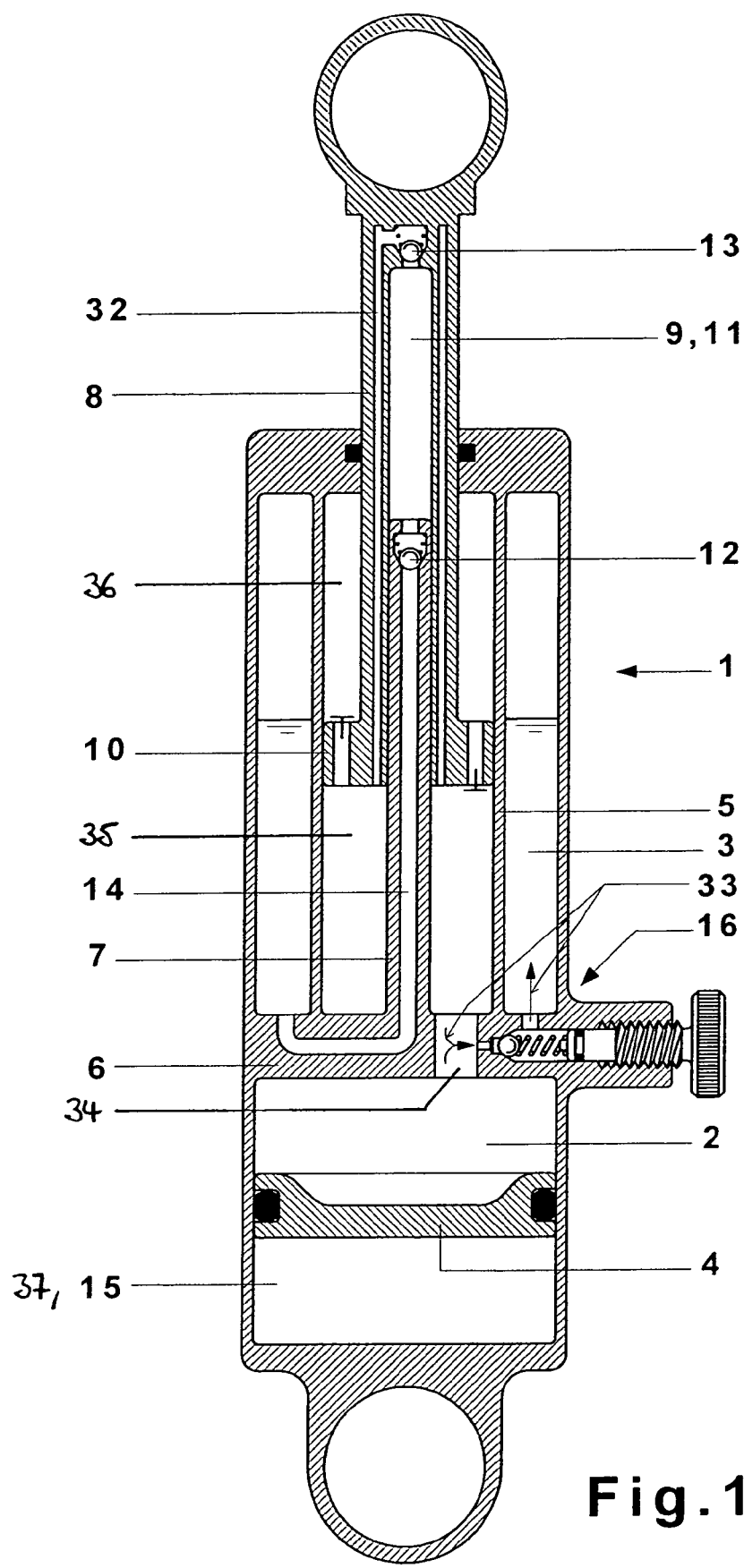
FIG. 1 is a cross sectional view of a hydropneumatic spring strut with internal level control.

The self-pumping hydropneumatic spring strut with internal level control shown schematically in FIG. 1 has a cylinder 1 which accommodates a high-pressure chamber 2 and a low-pressure chamber 3, each filled with oil and gas. In the high-pressure chamber 2, a separating element 4 formed as a separating piston separates the oil from the gas cushion 37 which is contained in the high-pressure gas chamber 15. The high-pressure chamber 2 is arranged in the lower area of the cylinder 1.

Above the high-pressure chamber 2, a partition wall 6 is mounted on the end of a cylindrical pipe 5 and holds an upward extending pump rod 7, which in turn fits into a hollow piston rod 8 and forms a piston pump 9 together with the hollow piston rod 8. The low-pressure chamber 3 is arranged around this cylindrical pipe 5.

The damping piston 10 mounted on the inner end of the piston rod 8 within the cylindrical pipe 5 separates two working spaces 35 and 36 from each other and thus serves to damp the spring strut. Each of the two working spaces 35 and 36 is enclosed by the cylindrical pipe 5. The working space 35 is connected to the high-pressure chamber 2 via channel 34 formed in the partition wall 6.

When the piston rod 8 travels out from the cylindrical pipe 5, the pump space 11 between the inlet valve 12 and the outlet valve 13 becomes larger, and a flow of oil is produced. The oil passes from the low-pressure chamber 3 via the bore 14 in the pump rod 7 and the inlet valve 12 to the pump space 11. When the piston rod 8 travels inward, the oil passes via the outlet valve 13 and a downstream ring-shaped channel 32 to the high-pressure chamber 2.

As a result of the continuous pumping of the oil from the low-pressure chamber 3 into the high-pressure chamber 2, the gas in the high-pressure gas chamber 15 is subject to continuous pre-compression. Depending on how it is set, the valve 16 installed in the flow connection 33 between the high-pressure chamber 2 and the low-pressure chamber 3 allows the oil to flow into the low-pressure chamber 3 at a certain pressure and thus maintains the pressure level required to maintain the vehicle body at the desired height.

Because the piston pump 9 operates continuously, the pump rod 7 requires no control mechanism such as a bypass or a discharge bore.

For simple applications, the desired level can thus be determined by the manual adjustment of the valve 16.

Figure 2:
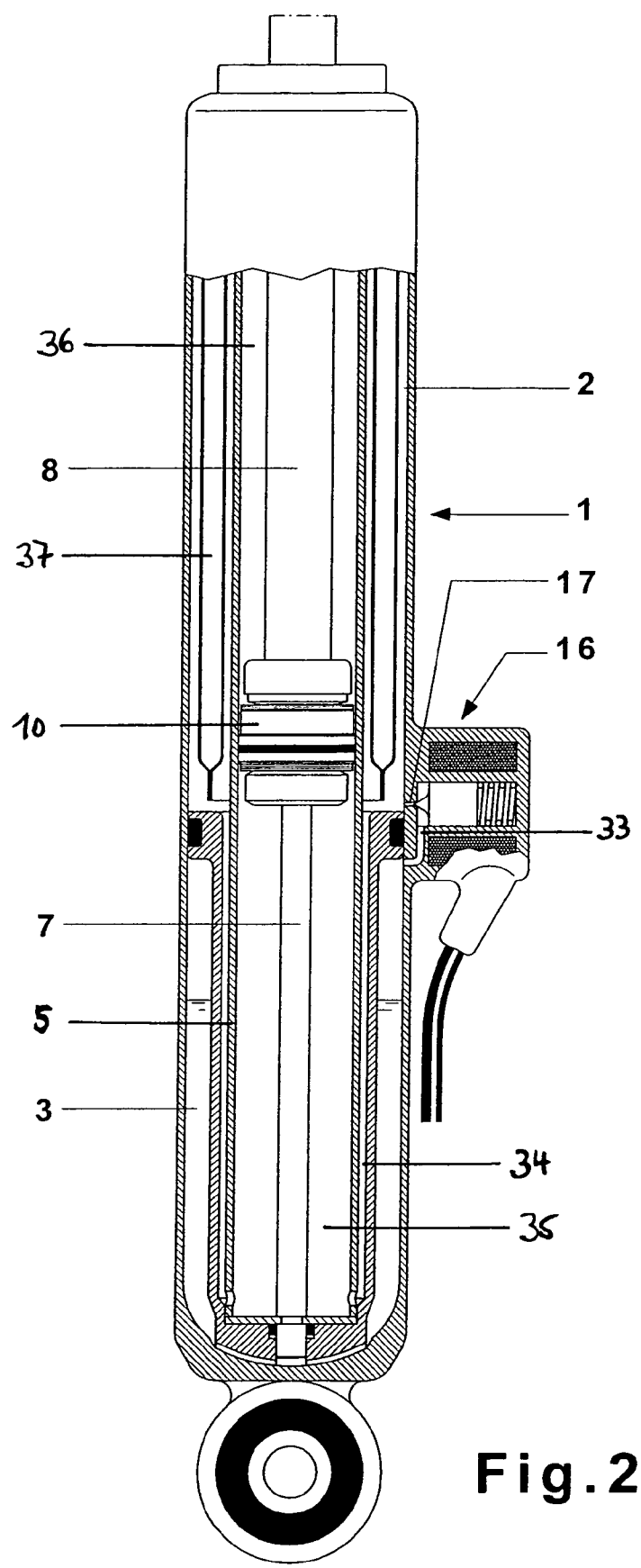
FIG. 2 is a cross sectional view of another embodiment of a spring strut with an externally controlled valve.

FIG. 2 shows a hydropneumatic spring strut with internal level control for motor vehicles, in which the valve 16 is controlled electrically and externally, this embodiment corresponding in principle to the exemplary embodiment of FIG. 1. Again, the pressure in the high-pressure chamber 2 is used to actuate the piston rod 8. However, the low-pressure chamber 3 is arranged in a lower part of the cylinder around the cylindrical pipe 5, and the high-pressure chamber 2 is arranged in an upper part of the cylinder 1 around the cylindrical pipe 5, whereas the first working space 35 is connected to the high-pressure chamber 2 by annular channel 34. The gas cushion 37 in the high-pressure chamber 2 is contained in a gas bag known in the art. As in the embodiment of FIG. 1, there is a flow connection 33 between the high-pressure chamber 2 and the low-pressure chamber 3, and a valve 16 is installed in that flow chamber 2 and the low-pressure chamber 3, and a valve 16 is installed in that flow connection 33.

Depending on how it is set, the valve 16 has the job of allowing the oil, which has been conveyed by the pump rod 7 from the low-pressure chamber 3 to the high-pressure chamber 2, to flow back into the low-pressure chamber 3 after the vehicle body has reached the desired level. This spring strut supplies itself independently with pressure, so that no outside energy of any kind is required to move the vehicle body to an appropriate level or to shift it from one level to another. On the contrary, the piston pump 9 is operated merely by the irregularities of the road. Because the oil flow to be regulated results from the reciprocating movement of the piston pump 9 and the small diameter of the pump rod 7, the control opening 17 can also be correspondingly small. This has the effect of minimizing the required control energy.

Because of the low energy demand, the valve 16 can easily be a directly controlled valve. The advantage lies here in the small size of such valves and thus in their correspondingly low cost.

To drive the valve 16 appropriately, a sensor (not shown) and a corresponding electronic circuit for realizing a fully automatic system can be provided, so that the vehicle can be adjusted to the necessary level for each load state and corresponding driving situation. For example, the vehicle body could be lowered during travel on the highway or raised for cross-country travel.

Figure 3:
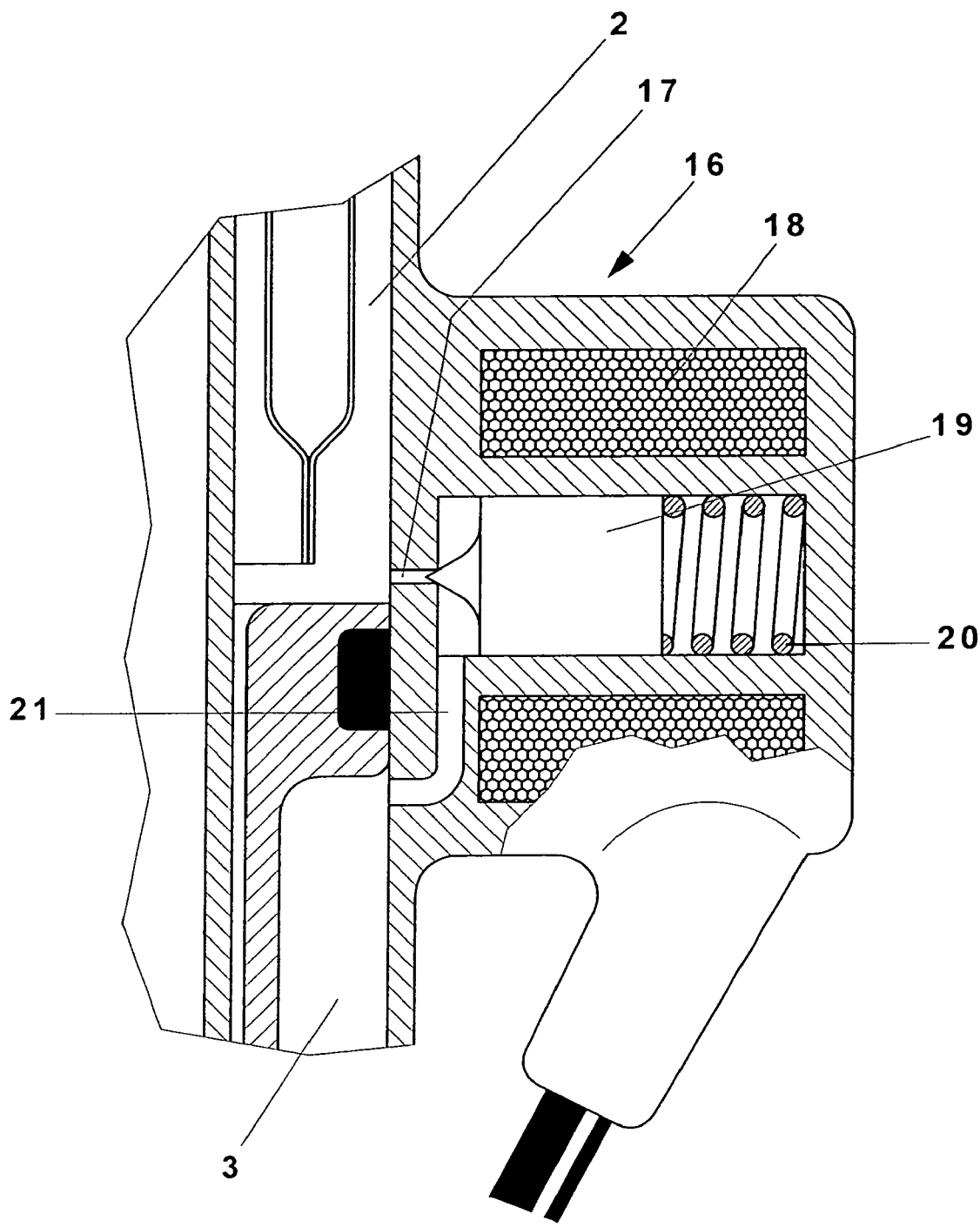
FIG. 3 is a detailed cross sectional view of the valve according to FIG. 2.

FIG. 3 shows a valve 16 on an enlarged scale, the valve consisting of a magnetic coil of an electromagnet 18, which acts on a valve body 19 (acting as the armature of a magnet). The valve body 19 is moved either toward the control opening 17 or in the opposite direction toward the spring 20.

When the magnetic force of the electromagnet acts in the direction toward the control opening 17, the force of the spring 20 is added to the controllable magnetic force, and the vehicle body is lowered in the event of an incident (power failure) and remains there.

When the magnetic force of the electromagnet 18 acts against the spring 20, the vehicle body is automatically raised in the event of an incident and remains there. During normal operation of the vehicle, the level is controlled automatically in such a way that the control opening 17 is kept closed with an appropriate force. When this force is exceeded by the pressure of the high-pressure chamber 2, the oil flows under pressure control via the discharge channel 21 back into the low-pressure chamber 3.

Figure 4:
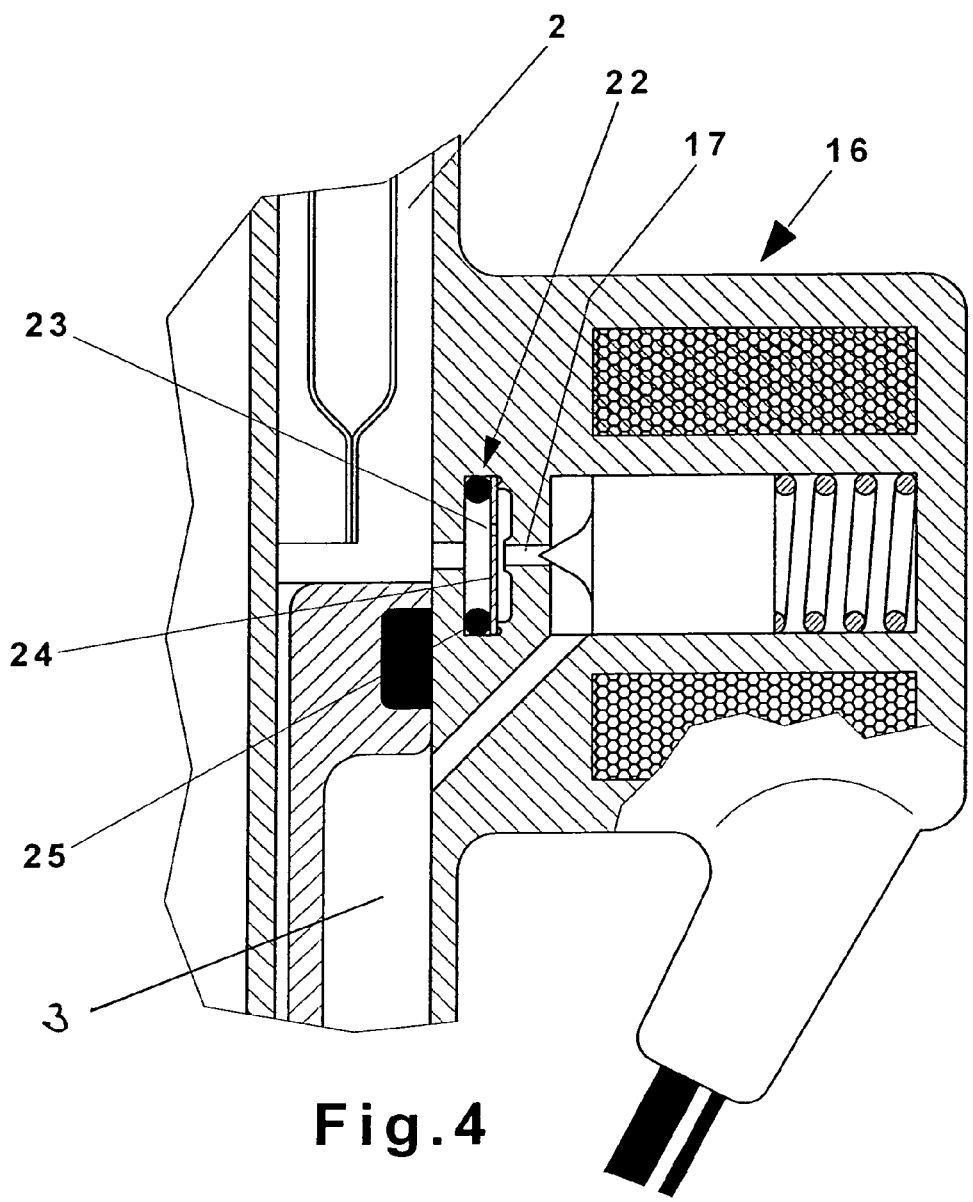
FIGS. 4 and 5 are cross sectional views of an externally controlled valve with a pilot stage.

FIG. 4 shows a valve 16 with a shut-off device 22. The shut-off device 22, by means of a throttle bore 23, shuts off the control opening 17 whenever the piston rod 8 travels abruptly inward. Otherwise, i.e., without this shut-off device 22, the pressure increase in the high-pressure chamber 2 would lead to a short-term pressure loss, the pressure level would drop, and it would be necessary to build up the pressure again. Providing this shut-off device 22 thus improves the automatic control of the vehicle body and also prevents the pressure drop which could occur during the damping of high pressures by the valves in the damping piston 10. The shut-off device 22 consists in this exemplary embodiment of a shut-off element 24 in the form of a thin, flexible disk, which is held against a stop by a spring element 25 in the form of an O-ring. When the deeply inserted piston rod travels back outward toward the adjusted level, the shut-off element 24 returns to its open position.

Figure 5:
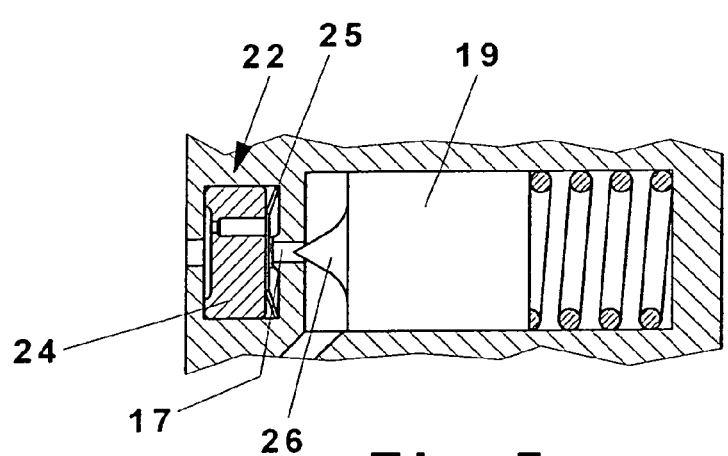

The shut-off device 22 shown in FIG. 5 has a shut-off element 24 in the form of piston, which is held against a stop by a spring element 25 in the form of a disk spring. In this embodiment, the valve body 19 shows a needle-shaped tip 26 facing the control opening 17. In addition to finely regulating needle valves of this type, plug or ball valves are conceivable here.

If it were desired to provide the valve body 19 with pressure equalization between its forward end surface and its rear end surface, it would be easy to provide the valve body 19 with a bore extending from the forward to the rear end surface (not shown).

Figure 6:
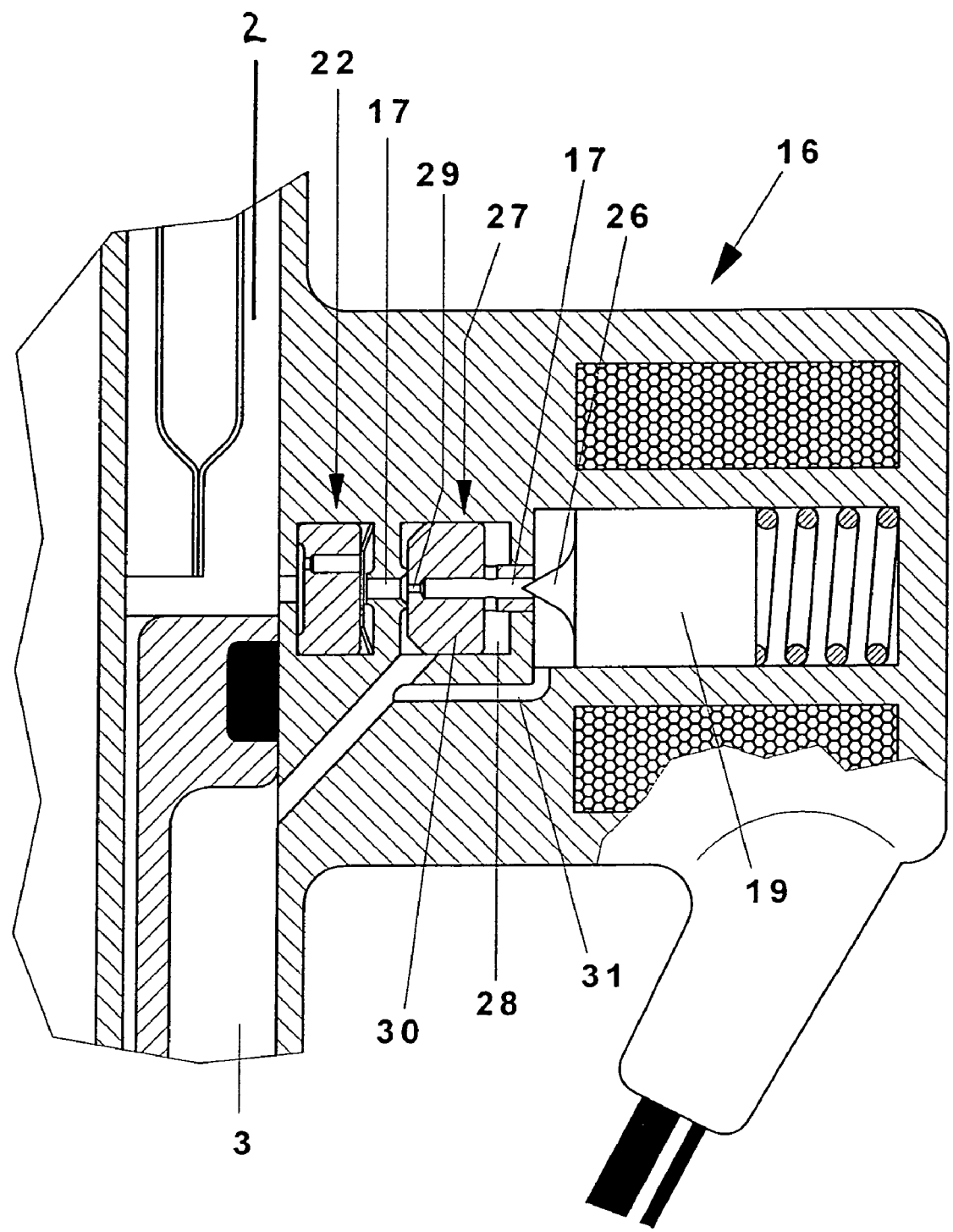
FIG. 6 is a cross sectional view of another embodiment of a pilot-controlled valve.

The exemplary embodiment of the valve 16 according to FIG. 6 shows a pilot control and a shut-off device 22. The actual valve 16 is used here as a pilot stage and therefore operates with a minimum of control energy. The main stage 27 itself is automatically controlled by the valve 16 as pilot stage. This type of pilot control operates as follows. When the needle-shaped tip 26 moves away from the control opening 17, the throttle 29 causes the pressure in the control space 28 to drop, and the slide 30 then opens the first control opening 17. The slide 30 always follows the movement of the valve body 19. The channel 31, which leads to the main discharge channel and ultimately, together with it, to the low-pressure chamber 3, allows the oil to return from the pilot stage.

In principle, pressure control by means of an inductive control drive (based on a magnetic coil) is especially advantageous, but drives such as piezo controls, for example, could also easily be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut with an internal level control, comprising:
    a cylinder defining a high-pressure chamber and a low-pressure chamber, both chambers being at least partially filled with oil, the high-pressure chamber further comprising a gas cushion acting as a spring element;
    an axially movable hollow piston rod arranged within the cylinder and carrying a working piston separating two working spaces arranged in the cylinder, one of the working spaces being connected to the high-pressure chamber;
    a piston pump driven by movements of the spring element for conveying oil from the low-pressure chamber to the working space connected to the high-pressure chamber, the piston pump having a first flow connection which connects the high-pressure chamber to the low-pressure chamber; and
    an adjustable valve arranged in a second flow connection between the high-pressure chamber and the low-pressure chamber, the second flow connection being separate from the first flow connection, the valve opening as a function of pressure in the high-pressure chamber to allow the oil to pass from the high-pressure chamber to the low-pressure chamber.

2. The spring strut of claim 1, wherein the valve is adapted to adjust a level of a motor vehicle as a function of pressure.

3. The spring strut of claim 1, wherein the valve can be controlled manually and externally.

4. The spring strut of claim 1, further comprising an electromagnet for externally controlling the valve.

5. The spring strut of claim 1, wherein the valve comprises a valve body acting upon the second flow connection.

6. The spring strut of claim 5, further comprising a spring loading the valve body.

7. The spring strut of claim 5, wherein the valve body is under a pilot control of an internal pressure of the spring strut.

8. The spring strut of claim 1, further comprising a shut-off element in the second flow connection, the shut-off element acting as a function of pressure.

9. The spring strut of claim 8, further comprising a spring actuating the shut-off element.

10. The spring strut of claim 1, wherein the valve is arranged and dimensioned to prevent the passage of oil through the second flow connection in a direction from the low-pressure chamber to the high-pressure chamber.

\* \* \* \* \*

UNITED STATES PATENT AND TRADEMARK OFFICE
CERTIFICATE OF CORRECTION

| | | |
|---|---|---|
| PATENT NO. | : 7,344,127 B2 | |
| APPLICATION NO. | : 11/543697 | |
| DATED | : March 18, 2008 | |
| INVENTOR(S) | : Hubert Beck | |

It is certified that error appears in the above-identified patent and that said Letters Patent is hereby corrected as shown below:

Title page should read

--[30] Foreign Application Priority Data

Oct. 13, 2005 (DE)          10 2005 048 742--

Signed and Sealed this

First Day of July, 2008

JON W. DUDAS
*Director of the United States Patent and Trademark Office*